United States Patent
Müller et al.

(10) Patent No.: US 6,689,434 B2
(45) Date of Patent: Feb. 10, 2004

(54) FRONTAL PART COMPRISING A DECORATIVE PART

(75) Inventors: Klaus Müller, Sulzbach (DE); Klaus Klemm, Oberelsbach (DE)

(73) Assignee: Basell Polyolefine GmbH, Wesseling (DE)

( * ) Notice: Subject to any disclaimer, the term of this patent is extended or adjusted under 35 U.S.C. 154(b) by 48 days.

(21) Appl. No.: 09/737,849

(22) Filed: Dec. 18, 2000

(65) Prior Publication Data

US 2001/0054838 A1 Dec. 27, 2001

(30) Foreign Application Priority Data

Dec. 20, 1999 (DE) .......................... 199 61 890

(51) Int. Cl.[7] ............................. B65D 91/100
(52) U.S. Cl. .................. 428/34.1; 428/68; 428/204; 428/205; 24/704
(58) Field of Search ............ 428/68, 204, 205; 24/704

(56) References Cited

U.S. PATENT DOCUMENTS

| | | | | |
|---|---|---|---|---|
| 3,392,497 A | * | 7/1968 | Cushman | 52/241 |
| 4,490,893 A | * | 1/1985 | Muller | 24/704 |
| 4,853,270 A | * | 8/1989 | Wycech | 428/68 |
| 4,857,613 A | | 8/1989 | Zolk et al. | 526/128 |
| 5,288,824 A | | 2/1994 | Kerth et al. | 526/128 |
| 5,340,623 A | | 8/1994 | Menjo et al. | 428/31 |
| 5,876,084 A | | 3/1999 | Smith et al. | 296/39 |
| 5,925,211 A | | 7/1999 | Rakauskas | 156/306 |
| 5,955,203 A | | 9/1999 | Briggs et al. | 428/460 |

FOREIGN PATENT DOCUMENTS

| | | | |
|---|---|---|---|
| DE | 196 04 370 | 6/1997 | |
| DE | 2000-202978 | * 7/2000 | B32B/33/00 |
| DE | 2001-010007 | * 1/2001 | B32B/31/20 |
| EP | 0 045 975 | 2/1982 | |
| EP | 0 045 977 | 2/1982 | |
| EP | 0 086 473 | 8/1983 | |
| EP | 0 171 200 | 2/1986 | |
| FR | 77 17862 | 5/1979 | |
| GB | 2 111 066 | 6/1983 | |
| JP | 11062410 | 3/1999 | |

* cited by examiner

*Primary Examiner*—C. Melissa Koslow
*Assistant Examiner*—Shalie Manlove
(74) *Attorney, Agent, or Firm*—Keil & Weinkauf

(57) ABSTRACT

A frontal part comprising a decorative part made from a support, from a decorative layer applied thereto, and from a heat-cured layer situated on the decorative layer, and also, if desired, comprising a reinforcer for supporting the decorative part. The frontal part may also comprise an intermediate layer between the support and the decorative layer. The support and the reinforcer may each be composed of a thermoplastic, for example of polypropylene or of polyethylene.

15 Claims, 2 Drawing Sheets

FRONTAL PART COMPRISING A DECORATIVE PART

Figure 1:
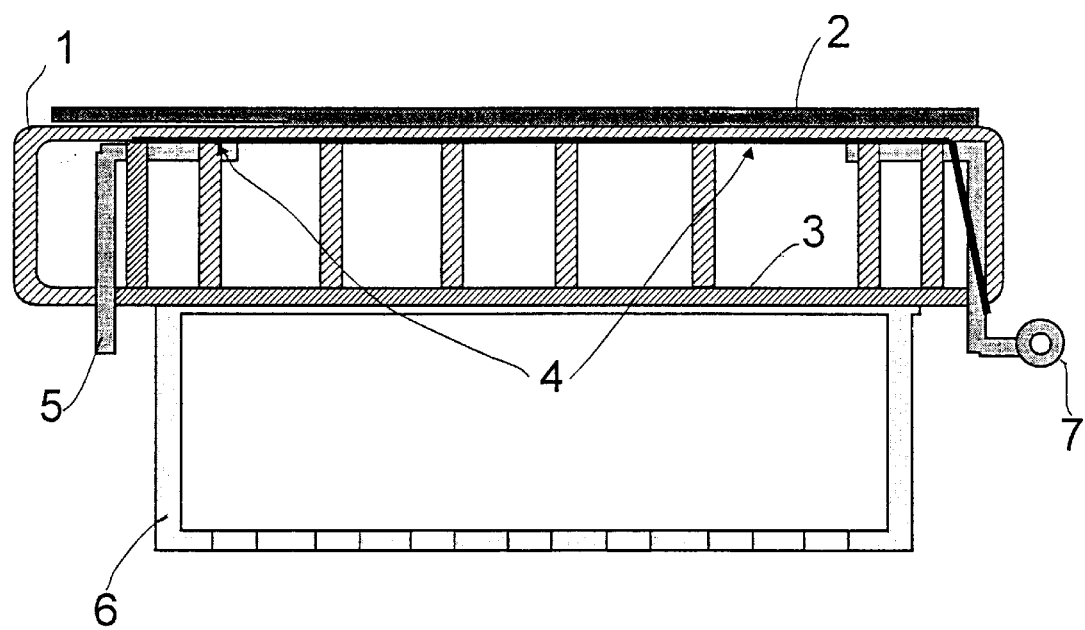

The present invention relates to a frontal part comprising a decorative part made from a support, from a decorative layer applied thereto, and from a heat-cured layer situated on the decorative layer, and also, if desired, comprising a reinforcer for supporting the decorative part. The present invention further relates to a process for producing the novel molding, and also to its use in household electrical devices, for furniture fronts or for the frontal area of automobiles.

Frontal parts known are composed either of a particle board to which a decorative layer has been applied, or else of a surface-coated steel sheet.

A disadvantage here of frontal parts made from particle boards with a decorative layer applied is that they have to be provided with an edging, and this also has to be bonded in a moisture-proof manner, since particle boards tend to swell in moist environments. In addition, frontal parts of this type made from particle boards with a decorative layer applied cannot be recycled. Frontal parts made from surface-coated steel plate are very complicated to produce and are therefore very expensive, in particular when produced in relatively small numbers, and the surface coating also limits the selection of different decorative effects. The possibilities for shaping the frontal parts known hitherto are, furthermore, limited, and additional functional elements also have to be molded onto the frontal parts in separate operations.

DE-A 19604370 has moreover disclosed worktops made from thermoplastics and comprising a plastic sheet, to the underside of which has been applied a supporting apparatus which is composed of a grating-like module with an open lower side. Although these worktops are moisture-resistant and can be recycled, their stability is insufficient for some application sectors.

It is an object of the present invention, therefore, to remove the disadvantages described and to produce an improved frontal part which is made from plastic, is moisture-resistant, can be recycled, can be produced in a simple manner and, furthermore, permits unrestricted shaping and the integration of functional elements.

We have found that this object is achieved by an improved frontal part comprising a decorative part made from a support, from a decorative layer applied thereto, and from a heat-cured layer situated on the decorative layer, and also, if desired, comprising a reinforcer for supporting the decorative part.

The decorative part present in the novel frontal part is preferably composed of a support, of a decorative layer applied thereto, and of a heat-cured layer situated on the decorative layer. It can also be advisable to insert an intermediate layer between the support and the decorative layer. It is also possible, if desired, for there to be the corresponding intermediate layers, decorative layers and heat-cured layers applied on both sides of the support, giving a sandwich-type structure with the support in the middle. There may also be functional elements molded onto the decorative part.

Based on the total weight of the support, the material of the support may comprise from 1 to 60% by weight, preferably from 5 to 50% by weight, particularly preferably from 10 to 40% by weight, of reinforcing fillers, such as barium sulfate, magnesium hydroxide, talc with an average particle size of from 0.1 to 10 $\mu$m, measured to DIN 66 115, wood, flax, chalk, glass fibers, coated glass fibers, long or short glass fibers, glass beads or mixtures of these. The material of the support may also comprise the usual additives, such as light stabilizers, UV stabilizers, heat stabilizers, pigments, carbon blacks, lubricants, flame retardants, blowing agents and the like, in the amounts which are usual and required. The support is in particular composed of thermoplastics.

Examples of thermoplastics which form the support for the decorative part are polypropylene, polyethylene, polyvinyl chloride, polysulfones, polyether ketones, polyesters, polycycloolefins, polyacrylates and polymethacrylates, polyamides, polycarbonate, polyurethanes, polyacetals, e.g. polyoxymethylene, polybutylene terephthalates and polystyrenes. Both homopolymers and copolymers of these thermoplastics may be used here. Besides the reinforcing fillers, the supporting layer is preferably composed of polypropylene, polyoxymethylene, polybutylene terephthalate or polystyrene, in particular of copolymers of styrene with subordinate proportions of one or more comonomers, e.g. butadiene, $\alpha$-methylstyrene, acrylonitrile, vinylcarbazole, or esters of acrylic, methacrylic or itaconic acid. The support of the novel frontal part may also comprise recycled materials made from these thermoplastics.

For the purposes of the present invention, polyoxymethylenes are homo- or copolymers of aldehydes, for example of formaldehyde, and of cyclic acetals. These have repeating carbon-oxygen bonds in the molecule and have melt flow rates (MFR), to ISO 1133, of from 5 to 40 g/10 min, in particular from 5 to 30 g/10 min, at 230° C. under a load of 2.16 kg.

The polybutylene terephthalate preferably used is a relatively high-molecular-weight esterification product of terephthalic acid with butylene glycol and has a melt flow rate (MFR), to ISO 1133, of from 5 to 50 g/10 min, in particular from 5 to 30 g/10 min, at 230° C. under a load of 2.16 kg.

Copolymers of styrene are in particular copolymers having up to 45% by weight, preferably up to 20% by weight, of copolymerized acrylonitrile. These copolymers made from styrene and acrylonitrile (SAN) have a melt flow rate (MFR), to ISO 1133, of from 1 to 25 g/10 min, in particular from 4 to 20 g/10 min, at 230° C. under a load of 2.16 kg.

Preference is also given to the use of copolymers of styrene comprising up to 35% by weight, in particular up to 20% by weight, of copolymerized acrylonitrile and up to 35% by weight, in particular up to 30% by weight, of copolymerized butadiene. The melt flow rate of these copolymers made from styrene, acrylonitrile and butadiene (ABS), to ISO 1133, is from 1 to 40 g/10 min, in particular from 2 to 30 g/10 min, at 230° C. under a load of 2.16 kg.

Other materials used for the support of the decorative part are in particular polyolefins, such as polyethylene or polypropylene, preferably the latter. For the purposes of the present invention, polypropylene is a homo- or copolymer of propylene. Copolymers of propylene contain subordinate amounts of monomers copolymerizable with propylene, for example $C_2$–$C_8$ 1-alkenes, such as ethylene, 1-butene, 1-pentene or 1-hexene. It is also possible to use two or more different comonomers.

Examples of particularly suitable support materials are homopolymers of propylene or copolymers of propylene with up to 50% by weight of other copolymerized 1-alkenes having up to 8 carbon atoms. The copolymers of propylene here are random copolymers or block or impact copolymers. If the copolymers of propylene have a random structure they generally contain up to 15% by weight, preferably up to 6% by weight, of other 1-alkenes having up to 8 carbon atoms, in particular ethylene, 1-butene or a mixture of ethylene and 1-butene.

Block or impact copolymers of propylene are polymers for which the first stage is to prepare a propylene homopolymer or a random copolymer of propylene with up to 15% by weight, preferably up to 6% by weight, of other 1-alkenes having up to 8 carbon atoms and then, in the second stage, polymerize onto this a propylene-ethylene copolymer having an ethylene content of 15 to 80% by weight, where the propylene-ethylene copolymer may also contain other $C_4$–$C_8$ 1-alkenes. The amount of the propylene-ethylene copolymer polymerized on here is generally such that in the final product the proportion of the copolymer produced in the second stage is from 3 to 60% by weight.

The polymerization to prepare polypropylene may use a Ziegler-Natta catalyst system. The catalyst systems used here are in particular those which have cocatalysts in the form of organic aluminum compounds b) and electron-donor compounds c), as well as a titanium-containing solid component a).

It is, however, also possible to use catalyst systems based on metallocene compounds and, respectively, based on metal complexes active in polymerization.

Specifically, usual Ziegler-Natta catalyst systems comprise a titanium-containing solid component, inter alia halides or alcoholates of tri- or tetravalent titanium, and also a halogen-containing magnesium compound, inorganic oxides, e.g. silica gel, as supports, and also electron-donor compounds. These are in particular carboxylic acid derivatives, or else ketones, ethers, alcohols or organosilicon compounds.

The titanium-containing solid component may be prepared by methods known per se. Examples of these are given, inter alia, in EP-A 45 975, EP-A 45 977, EP-A 86 473, EP-A 171 200, GB-A 2 111 066, U.S. Pat. No. 4,857,613 and U.S. Pat. No. 5,288,824. The process known from DE-A 195 29 240 is preferably used.

Suitable aluminum compounds b), besides trialkylaluminum compounds, are those compounds in which one alkyl group has been replaced by an alkoxy group or by a halogen atom, for example by chlorine or bromine. The alkyl groups may be identical or differ from one another and may be linear or branched. Preference is given to the use of trialkylaluminum compounds having alkyl groups each of which has from 1 to 8 carbon atoms, for example trimethylaluminum, triethylaluminum, triisobutylaluminum, trioctylaluminum or methyldiethylaluminum, or mixtures of these.

Other cocatalysts are used, besides the aluminum compound b), are generally electron-donor compounds c), such as mono- or polybasic carboxylic acids, carboxylic anhydrides or carboxylic esters, or else ketones, ethers, alcohols or lactones, or else organophosphorus or organosilicon compounds. The electron-donor compounds c) may be identical with or different from the electron-donor compounds used to prepare the titanium-containing solid component a).

Instead of Ziegler-Natta catalyst systems it is also possible to prepare polypropylene by using metallocene compounds and, respectively, metal complexes active in polymerization.

For the purposes of the present invention, metallocenes are complex compounds made from metals of transition groups of the Periodic Table with organic ligands, giving effective catalyst systems when combined with metallocenium-ion-forming compounds. When used to prepare polypropylene, the metallocene complexes in the catalyst system are generally in supported form. Supports frequently used are inorganic oxides, but it is also possible to use organic supports in the form of polymers, such as polyolefins. Preference is given to the inorganic oxides described above, which are also used to prepare the titanium-containing solid component a).

The central atoms in the metallocenes usually used are titanium, zirconium or hafnium, preferably zirconium. The central atom generally has bonding via a π bond to at least one, generally substituted, cyclopentadienyl group, and also to other substituents. The other substituents may be halogens, hydrogen or organic radicals, preferably fluorine, chlorine, bromine or iodine or $C_1$–$C_{10}$-alkyl. The cyclopentadienyl group may also be a constituent of an appropriate heteroaromatic system.

Preferred metallocenes contain central atoms which have bonding via two identical or different π bonds to two substituted cyclopentadienyl groups. Particularly preferred metallocenes are those in which there are substituents of the cyclopentadienyl groups bonded to both cyclopentadienyl groups. Particular preference is given to complexes whose substituted or unsubstituted cyclopentadienyl groups additionally have substitution on two adjacent carbon atoms by cyclic groups, where the cyclic groups may also have been integrated within a heteroaromatic system.

Other preferred metallocenes are those which contain only one substituted or unsubstituted cyclopentadienyl group which, however, has substitution by at least one radical also bonded to the central atom.

Examples of suitable metallocene compounds are
ethylenebis(indenyl)zirconium dichloride,
ethylenebis(tetrahydroindenyl)zirconium dichloride,
diphenylmethylene-9-fluorenylcyclopentadienylzirconium dichloride,
dimethylsilanediylbis(3-tert-butyl-5-methylcyclopentadienyl)zirconium dichloride,
dimethylsilanediyl(2-methyl-4-azapentalene)(2-methyl-4-(4'-methylphenyl)indenyl)zirconium dichloride,
dimethylsilanediyl(2-methyl-4-thiapentalene)(2-ethyl-4-(4'-tertbutylphenyl)indenyl)zirconium dichloride,
ethanediyl(2-ethyl-4-azapentalene)(2-ethyl-4-(4'-tertbutylphenyl)indenyl)zirconium dichloride,
dimethylsilanediylbis(2-methyl-4-azapentalene)zirconium dichloride,
dimethylsilanediylbis(2-methyl-4-thiapentalene)zirconium dichloride,
dimethylsilanediylbis(2-methylindenyl)zirconium dichloride,
dimethylsilanediylbis(2-methylbenzindenyl)zirconium dichloride,
dimethylsilanediylbis(2-methyl-4-phenylindenyl)zirconium dichloride,
dimethylsilanediylbis(2-methyl-4-naphthylindenyl) zirconium dichloride,
dimethylsilanediylbis(2-methyl-4-isopropylindenyl) zirconium dichloride and
dimethylsilanediylbis(2-methyl-4,6-diisopropylindenyl) zirconium dichloride, and also the corresponding dimethylzirconium compounds.

The metallocene compounds are either known or can be obtained by known methods. It is also possible to use mixtures of metallocene compounds of this type for catalysis, or to use the metallocene complexes described in EP-A 416 815.

The metallocene catalyst systems also comprise metallocenium-ion-forming compounds. Those suitable are strong, neutral Lewis acids, ionic compounds with Lewis-acid cations or ionic compounds with Brönsted acids as cation. Examples of these are tris(pentafluorophenyl)borane, tetrakis(pentafluorophenyl)borate and salts of N,N- dimethylanilinium. Other suitable metallocenium-ion-forming compounds are open-chain or cyclic aluminoxane compounds. These are usually prepared by reacting trialkylaluminum compounds with water and are generally mixtures of linear and also cyclic chain molecules of various lengths.

The metallocene catalyst systems may moreover comprise organometallic compounds of the metals of the 1st, 2nd or 3rd main group of the Periodic Table, for example n-butyllithium, n-butyl-n-octylmagnesium or triisobutylaluminum, triethylaluminum or trimethylaluminum.

The polypropylenes used for the support layer are prepared by polymerization in at least one reaction zone, or else frequently in two or even more reaction zones arranged in series (a reactor cascade), in the gas phase, in suspension or in the liquid phase (bulk). The usual reactors for polymerizing $C_2$–$C_8$ 1-alkenes may be used. Examples of suitable reactors are continuous stirred-tank reactors, loop reactors and fluidized-bed reactors. The size of the reactors is not significant here. It depends on the output which is to be achieved in the individual reaction zone(s).

Use is in particular made of fluidized-bed reactors or else horizontally or vertically agitated powder-bed reactors. The reaction bed is generally composed of the polymer made from $C_2$–$C_8$-1-alkenes which is polymerized in the respective reactor.

The polypropylenes used as support layers are polymerized under conventional reaction conditions at from 40 to 120° C., in particular from 50 to 100° C., and at pressures of from 10 to 100 bar, in particular from 20 to 50 bar.

The polypropylenes used as supports generally have a melt flow rate (MFR), to ISO 1133, of from 0.1 to 200 g/10 min, in particular from 0.2 to 100 g/10 min, at 230° C. under a load of 2.16 kg.

It is also possible to use blends, i.e. mixtures of different thermoplastics, as support for the decorative part of the novel frontal part, for example blends made from a copolymer of styrene with acrylonitrile and a copolymer made from butadiene and acrylonitrile.

The decorative part preferably also comprises an intermediate layer between the support and the decorative layer, in particular a bonding layer made from a thermoplastic, preferably from the thermoplastic used to make the support, and this particularly improves the adhesion between support and intermediate layer. The intermediate layer is in particular a thin film or a thin web of thickness from 0.001 to 1.0 mm, in particular from 0.005 to 0.3 mm. Possible materials for the intermediate layer are the thermoplastics described above for the supports, i.e. in particular polypropylene and polyethylene, polymers of styrene, polyoxymethylene or polybutylene terephthalate.

Other materials preferred as intermediate layer are resin-saturated webs and resin-saturated thermoplastic films. The resins used for this are in particular acrylate resins, phenolic resins, urea resins or melamine resins. The degree of resinification here may be up to 300%, meaning that practically the entire surface of the intermediate layer has more than one coating of resin. The degree of resinification is preferably from 50 to 150%, in particular from 80 to 120%. The weight of the intermediate layer per $m^2$ is from 15 to 150 g, in particular from 30 to 60 g.

The decorative part present in the novel frontal part also has a decorative layer between the support and the heat-cured layer.

The decorative layer may be composed of a plastic which has an embossment or a coloration, or both combined, and this may be in the form of a ready-to-use laminate, for example. However, the decorative layer may also be composed of paper or of a fabric or of a paper-like or fabric-like or wood-like or metal-like material. Examples of these materials would be decorative layers made from an aluminum-type material or from a stainless-steel-type material or else from a leather-, silk-, wood-, cork- or linoleum-type material. The decorative layer may also have been resinified with acrylic resins, phenolic resins, urea resins or melamine resins, with a degree of resinification of from 50 to 300%, in particular from 100 to 300%, based on the weight of the decorative layer. The weight of the decorative layer is usually from 10 to 200 g/$m^2$, in particular from 30 to 150 g/$m^2$ and particularly preferably from 50 to 130 g/$m^2$. The decorative layer may also be composed of a colored plastic.

The heat-cured layer (overlay) arranged on the decorative layer is preferably composed of a thermoset, for example of a paper saturated with acrylic resin, with phenolic resin, with melamine resin or with urea resin and crosslinked by exposure to pressure or heat during the production of the layered composite material. The weight of the heat-cured layer (overlay) is usually from 10 to 300 g/$m^2$, in particular from 15 to 150 g/$m^2$ and particularly preferably from 20 to 70 g/$m^2$.

The heat-cured layer (overlay) may also, if desired, have been arranged as a ready-to-use laminate on the intermediate layer, on one or else on both sides. It is also possible to apply to the intermediate layer a ready-to-use laminate which is composed of the decorative layer and of the overlay. Ready-to-use laminates of this type are known per se and are available, inter alia, from Melaplast in Schweinfurt, Germany.

The overall thickness of the decorative part, composed of the support, the intermediate layer if used, the decorative layer and the heat-cured layer is from 0.5 to 10 mm, preferably from 1 to 3 mm, and at least 10%, preferably from 50 to 95%, of the overall thickness is made up by the support.

The decorative part may be produced by a process in which the materials for the decorative layer and for the heat-cured layer, and those of any intermediate layer used, in each case in the form of thin sheets, are put in place and then bonded at from 150 to 300° C., in particular from 160 to 280° C., to the material for the support.

The decorative layer and the heat-cured layer (overlay), and also, if used, the intermediate layer, may also be used together in the form of a ready-to-use laminate which is likewise a sheet. The bonding of the individual layers to one another may also take place by customary plastics industry processes. Examples of these customary processes are injection molding, extrusion and hot press molding of the individual layers. There may also be functional elements molded onto the decorative part.

The novel frontal part may also comprise a reinforcer with integrated, molded-on functional elements. The reinforcer may have a grating-like, ribbed, board-like or box-like structure, and preferably has a closed lower side and has the task of supporting the decorative part.

There may moreover be functional elements fastened to the decorative part and/or to the reinforcer. These functional elements permit, inter alia, a firm or movable connection to be made to a base, for example to the frame of a device or to a furniture carcass. For the purposes of the present invention, functional elements here include screw domes, screws, bolts, nuts, pins, rivets or clips for firm connection to the base, or else film hinges or springing elements made from plastic for a movable connection to the base. These functional elements may have been molded directly onto the decorative part or onto the reinforcer and be composed of the plastic used for the decorative part or for the reinforcer. However, the functional elements may also be welded to the decorative part or to the reinforcer, or else be introduced into the decorative part or into the reinforcer in the form of metal inserts. The inserts used may also be springing elements, hinges, lock parts, profiles or headings.

The reinforcer is preferably composed of thermoplastic polymers, and in relation to the specific types of thermoplastic polymers mention may be made of the description of the constituents of the support the decorative part. However, the reinforcer may also be composed of metals or else of thermosets. It may also be advisable to produce the reinforcer from the thermoplastic used for the decorative part, for example from polypropylene.

A reinforcer of this type with integrated and molded-on functional elements may be produced by producing a grating-type, board-type, box-type or rib-type base which preferably has a closed lower side directly with the functional elements (i.e. integrating these) or welding the base to the functional element(s), in which case the welding surface can also be removed from the visible area for esthetic reasons, to obtain an uninterrupted periphery. The grating-type, board-type, box-type or rib-type base may, however, also be connected to the integrated, molded-on functional element(s) by screwing or bolting, riveting or interlocking, or by way of elements for mechanical fastening, for example snap connectors. The dimensioning of the reinforcers, for example with regard to their wall thickness or rib geometry, may, for example, take place using the FEM computer calculation method based on the particular requirements which have to be met, since this can give a basic design with the greatest possible saving in material.

The base of board type, box type or rib type, and also the integrated, molded functional elements, which together form the reinforcer, may be produced by customary processes, for example by injection molding, extrusion, or hot press molding.

The novel frontal part can be produced by joining the decorative part to the reinforcer. A preferred production process here uses welding by means of a heating element to connect the decorative part to the reinforcer. However, it is also possible to connect the decorative part to the reinforcer by screwing or bolting, riveting or interlocking, or via mechanical fasteners, for example clips or snap connectors.

The connection of the novel frontal part to the appropriate base is usually made by way of molded-on elements for fastening, for example by screwing or bolting, by interlocking for by a combination of these, as appropriate to the requirements of the manufacturers of these household devices and their technical equipment. The specific arrangement of the novel frontal part here makes it possible to mold appropriate elements for fastening, for example screw domes, clips or snap connectors, directly onto the reinforcer straightaway, so that no additional mounting of fasteners is required.

The novel frontal parts feature, inter alia, high strength and stability, are moisture-, scratch- and chemicals-resistant, easy to produce and also recyclable, in particular if the thermoplastic used in the decorative part is that also used in the reinforcer. Since the reinforcer may have been provided with integrated, molded functional elements it is moreover possible to dispense with some operations when mounting the novel frontal part onto the appropriate household device.

The novel frontal part is suitable, inter alia, as a constituent of household electrical devices, for example as a constituent (door, cover or side part) of refrigerators, freezers, washing machines, dishwashers or dryers, or else for furniture fronts, such as those for kitchens, trailers or boats. The novel frontal part may also be used for the frontal area of automobiles, for example in paneling.

The process, which is also novel, for producing the frontal parts is simple to carry out and has the particular feature that it can be carried out using customary assembly processes.

The drawings below—FIGS. 1 and 2—give diagrams of some examples of embodiments of the novel frontal parts, and these are described in more detail below.

Figure 2:
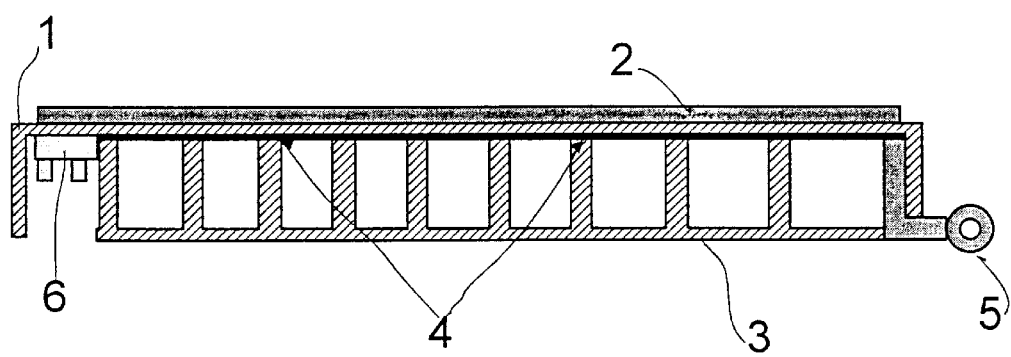

FIG. 1 shows a front door of a washer-dryer, and
FIG. 2 shows a furniture door front.

DESCRIPTION OF FIG. 1

FIG. 1 shows a front door for a washer-dryer, composed of a decorative part [support (1) and decorative layer (2)], welded to a reinforcer (3) with the aid of a heating element to give a component with a box-like structure [plane of welding (4)].

The support (1) is composed of a propylene homopolymer (e.g. Hostacom® PPU 2090L from Targor GmbH). The reinforcer (3) and the door cap (or coarse-mesh screen) (6) are composed of a talc-reinforced polypropylene (Hostacom® HC M4U42 from Targor GmbH).

Various functional elements, e.g. a lock (5) and the hinge parts (7), have been molded onto the reinforcer.

The steps for producing the front door are then as follows:
1) producing the individual parts door cap (coarse-mesh screen) (6), lock (5), hinge (7), reinforcer (3) and decorative part [support (1) and decorative layer (2)],
2) molding the door cap (coarse-mesh screen) (6) onto the reinforcer (3), and
3) welding the decorative part to the reinforcer. Operation 3 may also take place at an earlier stage in the form of operation 2. In this stage the two hinge parts (7) and the lock (5)—made of metal or of a thermoplastic, for example are—inserted between the decorative layer and the reinforcer and secured by a welding procedure.

DESCRIPTION OF FIG. 2

FIG. 2 shows a furniture door front, composed of a decorative part [support (1) and decorative layer (2)], welded with the aid of a heating element [welding (4)] to give a component with a box-like structure.

The support (1) is composed of a commercially available pigmented ABS plastic (terpolymer made from acrylonitrile, butadiene and styrene). The reinforcer (3) may be composed of a polystyrene provided with a blowing agent (and/or impact-modified), or of a recycled material made from ABS plastics. Functional elements, hinge part (5) and screw dome (6) for fastening the sheet to the furniture have already been molded onto the reinforcer (3). The door lock is welded on at the screw dome.

The part is then produced in the following steps:
1) production of the individual parts: reinforcer (with hinge part and screw dome) and decorative part (support and laminate), and
2) welding of the decorative part to the reinforcer.

We claim:
1. A frontal part comprising a decorative part made from a support, from a decorative layer applied thereto, and from a heat-cured layer situated on the decorative layer, and optionally comprising a reinforcer for supporting the decorative part.

2. A frontal part as claimed in claim 1, where there is also an intermediate layer present in the decorative part between the support and the decorative layer.

3. A frontal part as claimed in claim 1, where the reinforcer has a board, box, grating or ribbed structure.

4. A frontal part as claimed in claim 1, where the support is composed of a thermoplastic polymer.

5. A frontal part as claimed in claim 1, where the reinforcer is composed of a thermoplastic polymer.

6. A frontal part as claimed in claim 1, where additional functional elements have been molded onto the decorative part.

7. A frontal part as claimed in claim 1, where additional functional elements have been molded onto the reinforcer.

8. A process for producing a frontal part as claimed in claim 1, which comprises putting in place the materials for the decorative layer and the heat-cured layer, in each case in the form of sheets, and then bonding these at from 150 to 300° C. to the material for the support.

9. A process for producing a frontal part with a reinforcer, as claimed in claim 8, wherein the decorative part is connected to the reinforcer by a welding procedure.

10. A process for producing a frontal part with a reinforcer, as claimed in claim 8, wherein the decorative part is connected to the reinforcer by applying suitable snap connectors.

11. A process for producing a frontal part with a reinforcer, as claimed in claim 8, wherein the decorative part is connected to the reinforcer by applying screw, bolt or rivet connectors.

12. A household electrical device comprising a frontal part as claimed in claim 1.

13. An item of furniture comprising a frontal part as claimed in claim 1 in the frontal area.

14. A frontal area of an automobile comprising a frontal part as claimed in claim 1.

15. A process for producing a frontal part as claimed in claim 2, which comprises putting in place the materials for the decorative layer, the heat-cured layer and the intermediate layer, in each case in the form of sheets, and then bonding these at from 150 to 300° C. to the material for the support.

* * * * *